(12) United States Patent
Ettinger

(10) Patent No.: US 8,896,543 B2
(45) Date of Patent: Nov. 25, 2014

(54) VIRTUAL SYMBOLS-BASED KEYBOARD

(76) Inventor: Avi Ettinger, Tel Aviv (IL)

( * ) Notice: Subject to any disclaimer, the term of this patent is extended or adjusted under 35 U.S.C. 154(b) by 463 days.

(21) Appl. No.: 13/225,748

(22) Filed: Sep. 6, 2011

(65) Prior Publication Data

US 2012/0056816 A1  Mar. 8, 2012

Related U.S. Application Data

(60) Provisional application No. 61/380,269, filed on Sep. 6, 2010.

(51) Int. Cl.
*G09G 5/00* (2006.01)
*G06F 3/0488* (2013.01)
*G06F 3/023* (2006.01)

(52) U.S. Cl.
CPC .......... *G06F 3/04886* (2013.01); *G06F 3/0235* (2013.01)
USPC ............ 345/171; 345/156; 345/169; 345/173

(58) Field of Classification Search
CPC ............ G06F 3/04886; G06F 3/04883; G06F 3/0237; G06F 3/0236; G06F 3/0233
USPC .................................................. 345/168–183
See application file for complete search history.

(56) References Cited

U.S. PATENT DOCUMENTS

| | | | |
|---|---|---|---|
| 4,490,056 | A | 12/1984 | Whitaker |
| 5,307,267 | A | 4/1994 | Yang |
| 6,654,496 | B1 | 11/2003 | Goldberg |
| 2003/0020738 | A1 | 1/2003 | Milburn et al. |
| 2003/0027601 | A1 | 2/2003 | Guo et al. |
| 2003/0030573 | A1 | 2/2003 | Ure |
| 2003/0160712 | A1 | 8/2003 | Levy |
| 2003/0202832 | A1 | 10/2003 | Lorenzo |
| 2004/0264690 | A1 | 12/2004 | Coates et al. |
| 2005/0104750 | A1 | 5/2005 | Tuason |
| 2006/0101070 | A1 | 5/2006 | Eo et al. |

(Continued)

FOREIGN PATENT DOCUMENTS

| | | |
|---|---|---|
| WO | 02056167 A1 | 7/2002 |
| WO | 02059736 A1 | 8/2002 |

(Continued)

OTHER PUBLICATIONS

Unicode, Inc., The Unicode Standard Archived Code Charts, copyright 2005, Version 4.1.0, pages cited in office action.*

*Primary Examiner* — Christopher E Leiby

(74) *Attorney, Agent, or Firm* — J. Peter Paredes; Rosenbaum IP, P.C.

(57) ABSTRACT

A system for allowing a user to input text related data using a mobile device having an input and presentation unit. The system includes a virtual symbols keyboard, which includes virtual keys, each indicative of a graphical symbol, each graphically represents at least a part of a character, where the virtual symbols keyboard is configured to allow a user to input each character by touching a designated intermediate area between adjacent keys or by directly touching a virtual key using a single touch for inputting each character; and a processing module, which enables identifying a touch event over the virtual symbols keyboard, occurring over each virtual key and/or over each intermediate area and associating each touch event with a respective associated character according to the identified touch area. The processing module further allows presenting each identified associated character over the input and presentation unit.

18 Claims, 6 Drawing Sheets

(56) References Cited

U.S. PATENT DOCUMENTS

| | | |
|---|---|---|
| 2008/0117179 A1 | 5/2008 | Noh |
| 2008/0320410 A1* | 12/2008 | Whytock et al. ............. 715/773 |
| 2009/0033523 A1 | 2/2009 | Park |
| 2009/0174669 A1 | 7/2009 | Shkolnikov |
| 2009/0201252 A1 | 8/2009 | Lee |
| 2010/0197352 A1* | 8/2010 | Runstedler et al. ........... 455/566 |

FOREIGN PATENT DOCUMENTS

| | | |
|---|---|---|
| WO | 03014904 A2 | 2/2003 |
| WO | 03088202 A1 | 10/2003 |
| WO | 2007039746 A1 | 4/2007 |
| WO | 2007055532 A1 | 5/2007 |
| WO | 2008100089 A1 | 8/2008 |
| WO | 2009020295 A1 | 2/2009 |
| WO | 2010055400 A2 | 5/2010 |

* cited by examiner

| | |
|---|---|
| A/a=14=9+17 ⋂ + — = ⌒ | N/n=9 ⋂ |
| B/b=12=11+13 \| + ▢ = ᓄ | O/o=13 ▢ |
| C/c=19 ⊏ | P/p=16=21+13 ⌐ + ▢ = ₚ |
| D/d=15=19+11 ⊏ + \| = d | Q/q=23=19+27 ⊏ + ⌐ = q |
| E/e=18=19+17 ⊏ + — = E | R/r=4=3+5 ∨ + ⌐ = ∨⌐ |
| F/f=22=25+17 ⊢ + — = F | S/s=24=21+29 ⌐ + — = ⌐ |
| G/g=20=19+21 ⊏ + ⌐ = g | T/t=28=27+29 ⌐ + — = ⊥ |
| H/h=26=25+27 ⊢ + ⌐ = H | U/u=1 ∪ |
| I/i=11 \| | V/v=3 ∨ |
| J/j=21 ⌐ | W/w=2=1+3 ∪ + ∨ = ∪∨ |
| K/k=25 ⊢ | X/x=6=1+9 ∪ + ⋂ = ⋈ |
| L/l=27 ⌐ | Y/y=7=3+11 ∨ + \| = Y |
| M/m=10=9+11 ⋂ + \| = ⋒ | Z/z=5 ⌐ |
| Space bar " "=17 — | Period "."=29 — |
| Question mark "?" =8=5+13 ⌐▢ | |

Fig. 5

VIRTUAL SYMBOLS-BASED KEYBOARD

CROSS-REFERENCE TO RELATED PATENT APPLICATIONS

This application claims the benefit of Provisional patent application No. 61/380,269 filed on Sep. 6, 2010, which is incorporated herein by reference in its entirety.

FIELD OF THE INVENTION

The present invention generally relates to virtual keyboards and more particularly to symbols-based virtual keyboards.

BACKGROUND OF THE INVENTION

Virtual keyboards are increasingly used all over the world in various devices such as tablet computers and/or smart-phones (e.g. iPhones™, iPads™) typically including a touch screen enabling to use standard virtual alphanumeric keyboards. These alphanumeric keyboards typically include letter keys, punctuation mark keys, number keys and optionally function keys. These various keys and especially the letter keys add up to quite a large number of keys and when used in reduced compact devices such as mobile phones designed to be held by a single hand and placed in a person's pocket, can become extremely uncomfortable to use. For example, in the English language there are twenty-six letters requiring twenty-six different letter keys each representing a different letter. In this case, even when only using letter keys in a virtual keyboard, if the touch screen is too small, which is usually the case in reduced input devices such as smart-phones, in which touch screen is typically smaller than that of a tablet computer, it can be quite cumbersome and uncomfortable to press each letter key since the screen size reduction results in key size limitations. Therefore, reducing the number of keys required for inputting letter characters through the virtual keyboard can dramatically improve utilization of reduced or any other type of touch screens.

U.S. Pat. No. 5,307,267 by Yang Gong M. teaches a keyboard input device that includes symbol keys where a combination of symbol keys can be interpreted as a character if all respective symbol keys are simultaneously pressed by a user A patent application No. WO2007039746 by Maber Jonathan discloses a keyboard for entry of text characters that comprises: a plurality of keys and a processing means for detecting when at least one of the plurality of keys is pressed. Each of the plurality of keys has an indicia marked on its surface. When the processor detects that two or more of the plurality of keys have been pressed within a predetermined time period of each other, data corresponding to a text character visually resembling the combination of the indicia marked on the two or more of the plurality of keys is output. A corresponding method of text entry is also described. The output from the keyboard visually resembles the combination of the indicia on the keys.

U.S. patent application No. 2005104750 by Tuason Christopher discloses a compact keypad enabling direct single-press-per-character data entry, which is made possible by the use of adjacent combination key-press entries. The keys are sufficiently sized and spaced to enable the direct activation of any of a set of characters comprised of numbers, letters and symbols with a single finger stroke of either one individual key, or an adjacent combination of keys. According to Tuason the keys of the keypad, regardless of their individual shape or layout as a group, are placed in close enough proximity to allow two adjacent keys to be depressed either one-at-a-time, or both simultaneously by a single, one finger key stroke to code for a desired alphanumeric character, symbol, or arithmetic function.

Although these methods allow reducing the number of letter keys required, depending on symbols selection, when using a small compacted input device such as a mobile phone, making it possible to slightly enlarge the size of each key, it may be complicated and cumbersome for a user to remember the symbols combination that are required to build each character and to press them simultaneously. Moreover, simultaneously pressing of keys may often require using more than one hand and/or more than one finger to carry out this task, which may be a difficult or annoying for users who wish to use one hand/finger for pressing keys (e.g. for writing text message using their smart-phone) or even impossible for people having handicaps that only allow them to use a single finger, hand and the like.

SUMMARY OF THE INVENTION

According to some embodiments of the present invention, there is provided a system for allowing a user to input text related data using a mobile device having an input and presentation unit. the system comprises (a) a virtual symbols keyboard, which includes virtual keys, each indicative of a graphical symbol, where the virtual keys are presented over the input and presentation unit according to a predefined order, where each respective graphical symbol graphically represents at least a part of a character, and where the virtual symbols keyboard is configured to allow a user to input each character by touching a designated intermediate area between two adjacent keys or by directly touching a respective virtual key using a single touch for inputting each character; and (b) a processing module, which enables identifying a touch event over the virtual symbols keyboard, occurring over each virtual key and over each the intermediate area between respective adjacent virtual keys, and associating each touch event with a respective associated character according to the identified touch area. The processing module further allows presenting each identified associated character over the input and presentation unit.

Optionally, the virtual symbols keyboard includes twelve virtual symbol keys for inputting Latin Alphabet letters arranged as a table comprising four rows and three columns wherein:
1. a first row of said table includes the symbols: ∪ ∨ ⌐ in the respective order;
2. a second row of said table includes the symbols: ∩ | □ in the respective order;
3. a third row of said table includes the symbols: ⎯ ⊏ ⌐ in the respective order; and
4. a fourth row of said table includes the symbols: ⊢ L - in the respective order.

Additionally or alternatively, each vertical and horizontal adjacent pair of virtual keys and each of some of the virtual keys is associated with a single Latin letter, according to a predefined association index, wherein the processing module enables identifying and presenting each input Latin letter according to its corresponding touch area over the virtual symbols keyboard using this index.

Optionally, the input and presentation unit comprises at least one of: touch screen and/or, a set including a computer screen and a computer mouse and/or any other input device such as an electronic pen and the like.

Optionally, the system further comprises a software application enabling to operate the virtual symbols keyboard and the processing module. According to some embodiments, the software application is operated by a mobile device such as a cellular phone, a tablet communication device and the like, where the mobile device comprises the input and presentation unit (e.g. an iPhone® or an iPad® including a touch screen). According to other embodiments the software application is uploaded to and by the mobile device and is operated through a remote server communicating with the mobile device over at least one communication link.

Optionally, the virtual symbols keyboard comprises a letter keys cluster including the symbol virtual keys and additional virtual keys including at least one type of: function keys, punctuation marks keys, number keys.

According to some embodiments, the touching of a designated intermediate area between two adjacent virtual keys includes at least one of: clicking and dragging in at least one direction, dragging in at least one direction, and/or pressing over a designated intermediate area.

According to additional or alternative embodiments, the system further allows identifying touch through using at least one of: finger, designated touch tool operatively associated with said input and presentation unit.

Optionally, the processing module further enables receiving parameters indicative of characteristics of a display area of the input and presentation unit and determining and setting display characteristics of the virtual symbols keyboard thereover, according to these parameters.

According to additional or alternative embodiments, the virtual symbols keyboard allows a user to select at least one output type and the processing module enables adapting presentation according to the selected output type, where the output type comprises at least one of: audio output, visual output including text output.

Optionally, the system further comprises a user interface including the virtual symbols keyboard and a text window, for allowing presentation of each identified input character over the text window according to order of inputting thereof.

Optionally, the system enables indicating an unrecognized touch event when the user touches an area of the virtual symbols keyboard that is not associated with any character, punctuation mark or function. The indication includes at least one of: visual indication, auditory indication.

According to some embodiments, the virtual symbols keyboard comprises twelve virtual symbol keys for inputting Latin alphabet letters comprising the following symbols: UV ⊃ ∩ I □ ─ [and ] ⊢ L Optionally, the processing module further allows associating additional touch events according to predefined rules defining said touch events and their respective associated functions. For instance identifying continuous touch that includes both a key area and/or an intermediate area and a drag touch that exceeds predefined borders of the virtual symbols keyboard with additional functions such as identifying the input letter associated with the respective key or intermediate area as a capital letter mode.

According to some embodiments of the present invention, there is provided a computer implemented method for allowing a user to input text related data using at least one input and presentation unit. The method comprises: (i) providing a virtual symbols keyboard including virtual keys, each indicative of a graphical symbol, where the virtual keys are presented over the input and presentation unit according to a predefined symbols presentation order, each respective graphical symbol graphically represents at least a part of a character, where the virtual symbols keyboard is configured to allow a user to input each character by touching a designated intermediate area between two adjacent keys or by directly touching a key using a single touch for each input character; (ii) identifying each touch event over the virtual symbols keyboard, occurring over each virtual key and over each intermediate area between respective adjacent virtual keys, and associating each touch event with a respective associated character according to the identified touch area; and (iii) displaying each respective identified input character over the input and presentation unit.

According to some embodiments, the method further comprises receiving parameters indicative of characteristics of a display area of the input and presentation unit and determining display characteristics of the virtual symbols keyboard over the display area, according to the received parameters. Optionally, the display characteristics comprise dimensions of each virtual key and dimensions of intermediate areas between the virtual keys, wherein the display characteristics are additionally determined according to predefined threshold dimensions related parameters of each virtual key, and of each intermediate area between the virtual keys.

Additionally or alternatively, the method further comprises interfacing with at least one linguistic tool for allowing automotive spell checking and/or translation of input text.

According to some embodiments of the present invention, there is provided a system for allowing a user to input text related data using at least one input and presentation unit. The system comprises virtual keys, each indicative of a graphical symbol, where the virtual keys are presented over the input and presentation unit according to a predefined symbols presentation order, each respective graphical symbol graphically represents at least a part of a character, where the virtual symbols keyboard is configured to allow a user to input each character by touching a designated intermediate area between two adjacent keys or by directly touching a key using a single touch for each input character.

BRIEF DESCRIPTION OF THE DRAWINGS

FIG. 5 shows a table indicative of the keys combinations for each character in the ABC of the virtual symbols keyboard, according to some embodiments of the present invention.

DETAILED DESCRIPTION OF THE INVENTION

Figure 1:
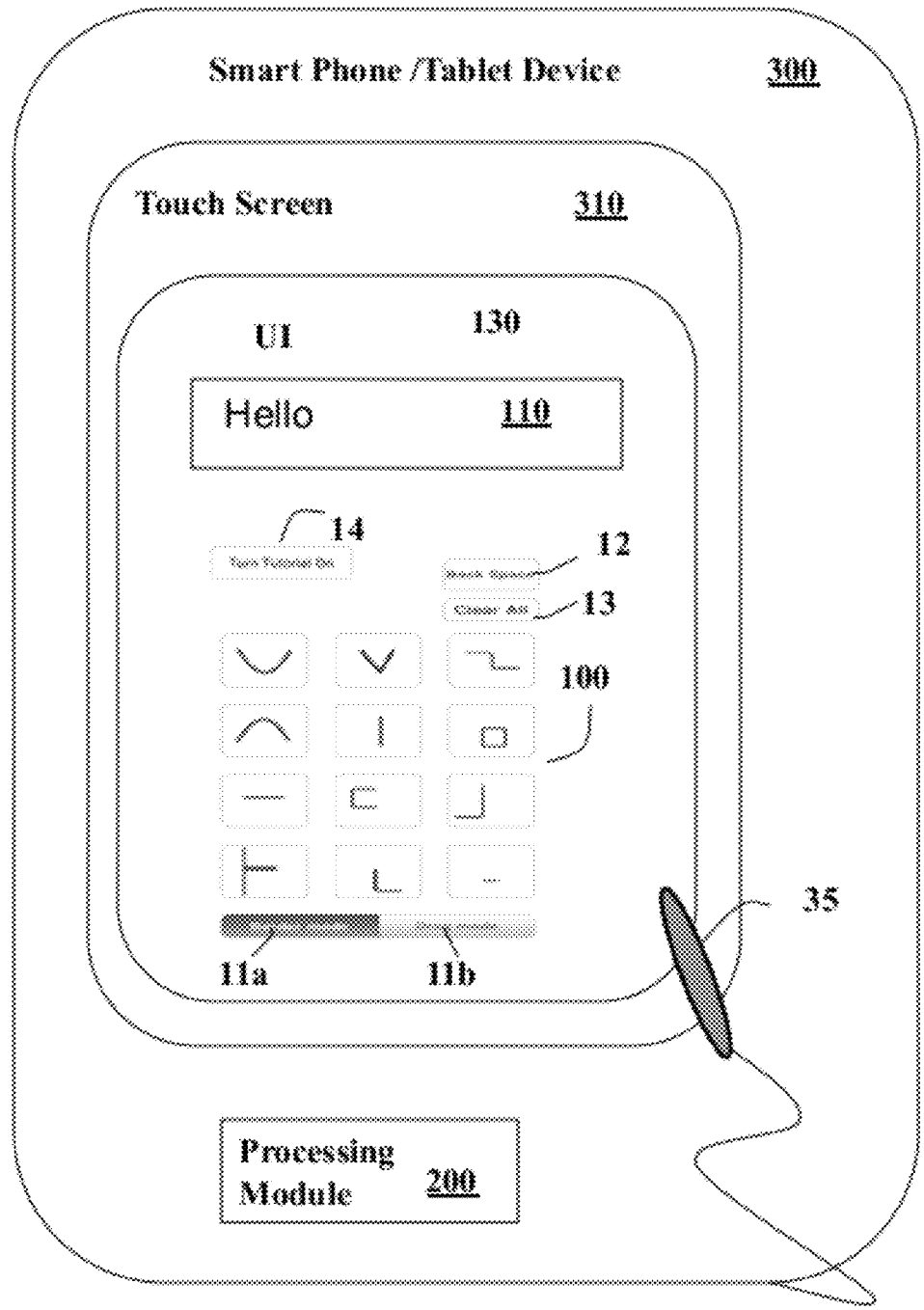
FIG. 1 is a block diagram, which schematically shows a system including a virtual symbols keyboard for inputting text using a mobile device having a touch screen, according to some embodiments of the present invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides virtual symbols keyboard systems and methods enabling ergonomic and enjoyable inputting of text using a reduced virtual keyboard including specially designed symbols, representing each respective key thereof. The virtual symbols keyboard may be presented over an input and presentation unit such as a touch screen or a set of screen and computer mouse or any other one or more devices enabling input and presentation of data operable by a mobile device such as a tablet computer, a smart phone and the like.

According to some embodiments of the present invention, each adjacent pair of virtual keys of the virtual symbols keyboard in the horizontal and/or the vertical direction is associated with a character such as a letter of the ABC (relating thereby to any Latin based language using the ABC letters). The virtual symbols keyboard may also include additional keys relating to other signs and/or purposes such as punctuation marks keys, number keys, function keys and the like, where the letters and optionally some of the punctuation marks symbol keys are designed as a cluster of keys therein. Some of the virtual symbol keys may also be directly associated with letters, meaning that a single key is associated with a single letter in addition to being associated with other letters when combined with adjacent symbol keys, allowing thereby a single key press to be identified or associated as a corresponding letter in addition to touch between adjacent symbol keys.

The system may include the virtual symbols keyboard, which is a user interface, and one or more processing modules enabling to receive and process the input data from the user interface to identify each input letter by identifying the touch area over the touch screen and also for allowing to present each respective identified letter according to the input order over the touch screen. As each pair of adjacent symbols virtual keys in the letter keys cluster is associated with a different letter, each "touch event" in a touch area between these pair of adjacent keys (also referred to as virtual keys) is associated with or identified as the corresponding letter, and each touch event over a single key (single-key press) may also be associated with a single letter or any other sing such as a punctuation mark, space, etc. To identify the corresponding character (e.g. letter/function/punctuation mark) of each touch event the processing module may use a predefined index, which associates each touch area over the virtual symbols keyboard with a corresponding character (e.g. letter, sing or space).

A "touch event" may include any one or more of: pressing over a single key, pressing over an area between two adjacent keys, click and drag touch between two adjacent keys and/or simultaneous pressing over two adjacent keys. The touch may be a result of an actual physical finger or tool touch over a touch screen for instance, in cases in which the input and presentation unit is a touch screen or a virtual touch by clicking and/or dragging the mouse while clicking thereof viewing it virtual touch over the screen.

Dragging (as in "click and drag") refers to touching an area associated with a first key without lifting the finger, the touch tool or the mouse arrow from the screen while dragging or continuously towards an adjacent key area for inputting of their corresponding character/letter. The borders separating each area over the touch screen for example, defining when there is a single key press and when there is a touch of an area between symbol virtual keys is defined by the processing module according to the definitions, location and size of the touch screen and of the area designated for the virtual symbols keyboard.

According to some embodiments of the present invention, the dragging may include all directional options of each pair of adjacent keys. For example, for a pair of horizontal adjacent keys the corresponding character may be identified if the user drags his/her finger or any other touch device from left to right or from right to left. In the same way for a pair of vertical adjacent keys the corresponding character may be identified if the user drags his/her finger or any other touch device upwards from the upper key to the adjacent lower downwards from the lower key to the upper one. Adding the ability to identify the corresponding letter if the user presses an area between the adjacent keys and/or if the user simultaneously presses the adjacent keys, leaves the user with many options for inputting the corresponding character according to his/her ability, comfort and desire.

The symbol indicated by each virtual key graphically relates to all the characters it is associated with. For example a symbol of a virtual key that is associated with the letters "x" and "u" will include graphical characteristics that are related to at least a part of the graphical characteristics of the associated letter such as the shape U. In this way the letter "u" will be intuitively associated with a single press over the U symbol virtual key and the letter "x" will be a combination of this key and another key (e.g. having a revered U shape).

According to some embodiments, the processing module receives parameters indicative of characteristics of a display area of the input and presentation unit (e.g. size of the touch screen, coordinates of an allocated display area and the like) and determine display characteristics of the virtual symbols keyboard over this display area, according to these parameters. The display characteristics of the virtual symbols keyboard may include, for instance, dimensions of each virtual key and dimensions of areas between the virtual keys (defined herein as "intermediate area").

Optionally, the display characteristics are additionally determined according to other parameters and methods such as according to predefined threshold dimensions such as minimal and/or maximal key and/or keyboard dimensions, minimal and/or maximal intermediate area dimensions and the like. The threshold dimensions may be required for allowing a normal-size human finger and/or a device used as a replacement thereof to be able to comfortably touch the designated areas with a stuffiest tactile separation between the keys areas.

Since only one touch is required to produce each character and/or other functions, the system, in some embodiments thereof, allows using a single finger and/or a single assistance tool replacing a finger to input text. This can help users having various disabilities as well as ordinary people that wish to use a single finger to input text using their mobile devices for various text-inputting services such as for inputting a Short Messaging Service (SMS) message, an email message and the like.

Reference is now made to FIG. 1, which is a block diagram, schematically showing a system, according to some embodiments of the present invention, including a user interface 130 including a virtual symbols keyboard 100 for inputting text using a mobile device 300 such as a smart-phone or a tablet computer having a touch screen 310 input and presentation unit integrated therein. User interface 130 allows inputting data through virtual symbols keyboard 100 and outputting of data therethrough, using touch screen 310 to allow the actual functionality thereof. The outputting of the data may include either outputting data type of: audio output (e.g. through audio output means of mobile device 300) and/or visual output (e.g. through a text window 110).

The user can input each character such as each letter, function or punctuation mark using virtual symbols keyboard 100, by touching an area in virtual symbols keyboard 100 that is associated with the desired character. Each such touch event can include either direct key pressing (meaning pressing or touching the area of a single virtual key) or touching an intermediate area between a pair of vertical and/or horizontal adjacent keys. Touching an intermediate area may be detected if the user drags his/her finger or any other tool serving as a finger replacement from one virtual key to the other adjacent virtual key, directly touching the area between those virtual keys and/or simultaneously touching both adjacent virtual keys, as mentioned above.

Processing module 200 identifies each touch event and its respective touch location and optionally the touch type allowing thereby to identify a character associated with the respective touch event by using a predefined index table such as an index table 50 for associating each touch area with a different Latin letter, space character or some punctuation marks such as a period mark, as shown in FIG. 5. Index table 50 allows associating each area over virtual symbols keyboard 100 with a different character by associating a virtual key and each pair of adjacent virtual keys to a different character.

According to some embodiments of the present invention, processing module 200 further allows presenting each respective identified input character through text window 110 or through any other output means according to predefined and/or selectable output requirements. For example, UI 130 may include an output type selection bar allowing the user to determine whether he/she wishes the input text to be aurally pronounced and/or visually displayed over text window 110. Processing module 200 may enable adapting presentation according to the user's selection.

For example, in case of selection of an audio output type, processing module 200 may include an algorithm that can identify words of the input text and aurally output a set of input characters only once assessing the word they make out. In this case even in cases in which the user has a common typing error the algorithm can guess the desired input word and output an auditory presentation thereof. To identify an end of each character string, the user may be required to press a designated key signifying that a word is completed. According to some embodiments of the present invention, the visual text presentation may be a default selection, where the audio presentation an optional addition so that the input text is always presented over text window 110 in addition to being aurally outputted.

According to some embodiments of the present invention, one or more touch tools can be used as finger replacement such as an electronic pen 35 connected to mobile device 300 via a wired or wireless connection.

According to some embodiments of the present invention, the system including processing module 200 and UI 130 is a software application operable by mobile device 300 having a touch screen input and display device 310. The software application may be installed or uploaded to mobile device 300 allowing interfacing functionality/machine definitions of the operation system of mobile device 300 for enabling using virtual symbols keyboard 100 therethrough.

According to some embodiments, processing module 200 receives parameters indicative of characteristics of a display area of input and presentation unit 310 (e.g. size of the touch screen, coordinates of an allocated display area and the like) and determines display characteristics of virtual symbols keyboard 100 over this display area, according to these parameters. The display characteristics may include, for instance, dimensions of each virtual key and dimensions of areas between the virtual keys (defined herein as "intermediate area").

Optionally, the display characteristics are additionally determined according to other parameters and methods such as according to predefined threshold dimensions such as minimal and/or maximal key and/or keyboard dimensions, minimal and/or maximal intermediate area dimensions and the like. The threshold dimensions may be required for allowing a normal-size human finger and/or a device used as a replacement thereof to be able to comfortably touch the designated areas with a stuffiest tactile separation between the keys areas. Optionally, processing module 200 receives screen data in real time from mobile device 300 including, for instance, screen orientation (e.g. profile/landscape orientation) and adjusts the presentation of virtual symbols keyboard 100 accordingly. This allows, for example, real time setting of the virtual keys display characteristics such as orientation, size, dimension (proportions) and distance from each other (defining thereby the display characteristics of the intermediate areas therebetween) upon identification of changes in a holding orientation of mobile device 300 (e.g. if the user rotates mobile device 300 from a first orientation position to a second orientation position such as from a vertical orientation to a horizontal orientation).

Figure 2:
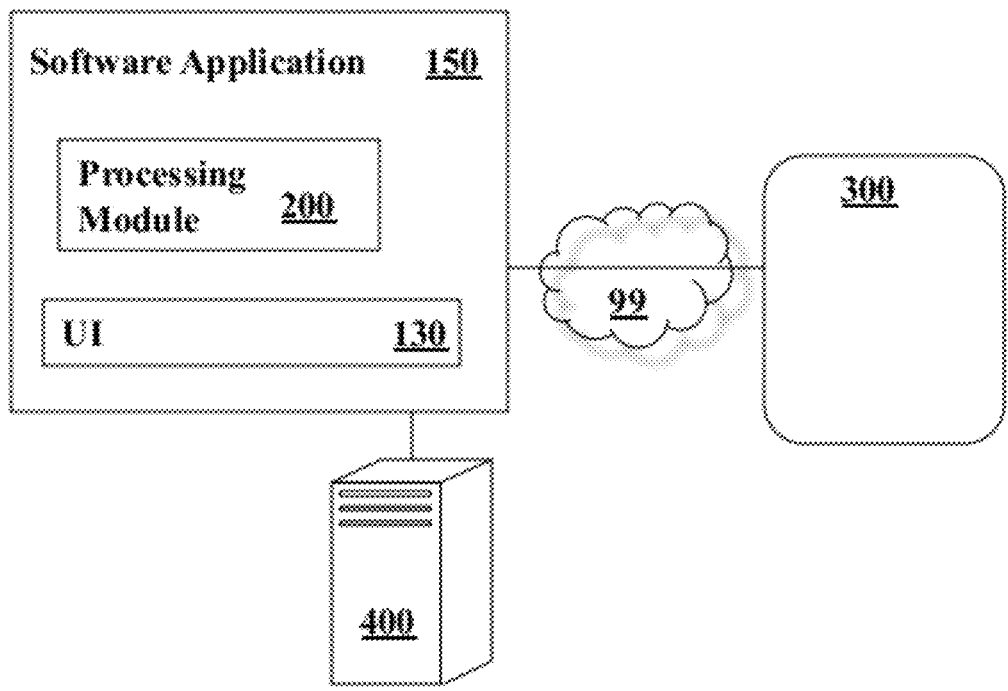
FIG. 2 is a block diagram, which schematically shows a system including a virtual symbols keyboard for inputting text using a smart-phone having a touch screen, according to other embodiments of the present invention.

Reference is now made to FIG. 2, schematically illustrating a software application 150 including UI 130 and processing module 200, according to other embodiments of the present invention. According to these embodiments, application 150 is operated through and maintained by a remote server 400, connecting to mobile device 300 through one or more communication links such as through wireless internet communication link 99. This configuration allows a mass amount of users to download the application 150 to their mobile devices or optionally to register to a service supported entirely through server 400 to use UI 130 and virtual symbols keyboard 100.

As illustrated in FIG. 1, virtual symbols keyboard 100 includes graphical symbols each representing a symbol that relates either to an entire character such as the letter U for instance and/or of a part of a letter form in the respective language or languages family it is associated with (also referred to as "language type" such as Latin). In this way the user can intuitively understand or grasp the letter or mark formed by each combination of adjacent virtual keys and/or each individual virtual key.

Figure 3:
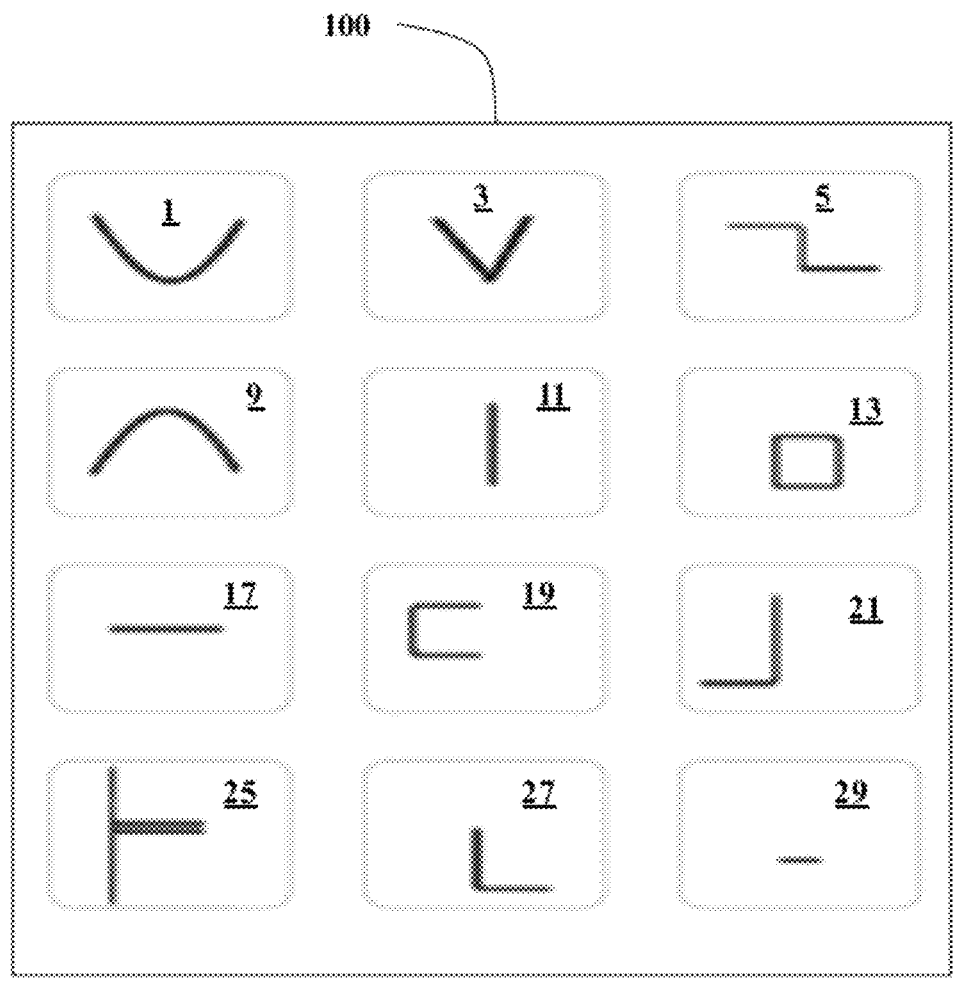
FIG. 3 shows the virtual symbols keyboard of FIG. 1, according to some embodiments of the present invention.
Figure 4:
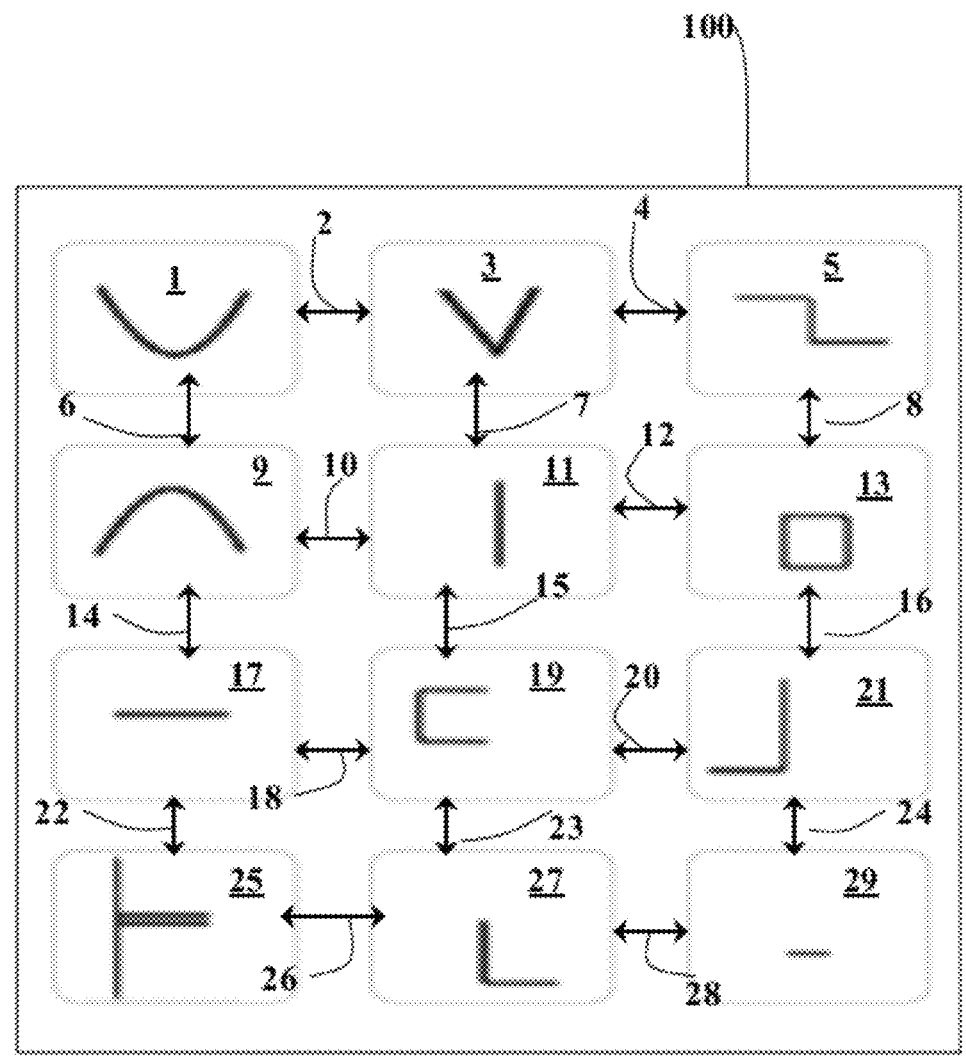
FIG. 4 shows the virtual symbols keyboard of FIG. 1 and the touch areas thereof, according to some embodiments of the present invention.

FIGS. 1, 3 and 4 show an embodiment of virtual symbols keyboard 100 enabling inputting letters and other characters or function keys of Latin based languages such as English, Italian, Spanish and the like using the ABC alphabet. According to this embodiment, virtual symbols keyboard 100 includes a matrix of four by three keys (four rows over three columns of virtual keys) totaling in twelve letter keys.

As illustrated, the first row includes three keys 1, 3, and 5, respectively indicative of the symbols: ∪ ∨ and ˥.

The second row includes three keys 9, 11, and 13, respectively indicative of the symbols: ∩ | and ▫.

The third row includes three keys 17, 19 and 21 of symbols: — ⊏ and ].

The fourth row includes three keys 25, 27 and 29 of symbols: ⊢ ∟ and —

The symbol on each key or symbols combination associated with a Latin letter on virtual symbols keyboard 100 may graphically resemble a lowercase letter such as d, t and b, for instance, or an uppercase letter such as A and L. In this example, as illustrated in index table 50, virtual symbols keyboard 100 is associated with a mixture of both lowercase and uppercase letters all in block letters, with the exception that the letter "r" is formed as a lowercase letter but in a cursive script.

As illustrated in FIGS. 1, 3 and 4, the location of the symbol in relation to its adjacent symbols' locations can also assist the user in intuitively perceiving the graphical logics for combining these keys to form each associated character. For example placement of the "L" sign 27 right under the open edge of the "C" sing 19 demonstrates how these two letters/symbols combine to form the Latin letter "q" as a lowercase block letter.

According to some embodiments of the present invention, as illustrated in FIG. 1, UI 130 may allow the user to select the clicking mode which determines the manner in which touch event over the intermediate areas is defined such as virtual border and drag mode buttons 11a and 11b, respectively. Additionally or alternatively, UI 130 includes a back space option 12 allowing the user to erase already inputted characters, a clear all option 13 allowing the user to erase all previously inputted characters, and/or a tutorial on/off option 14, for providing the user with instructions and explanations regarding the use and purposes of the system.

According to some embodiments of the invention, processing module 200 further allows associating additional touch events with additional functions, according to predefined rules, enabling the user to input additional characters or execute functions thereby using the reduced form of virtual symbols keyboard 100 without requiring additional virtual or non-virtual keys to do so. For example, if the user continues a dragging touch from a specific virtual key or an intermediate area between keys to the borders and/or out of the defined borders of virtual symbols keyboard 100, processing module 200 will translate this touch event as conversion of the specific associated letter from a cursive writing format to a block writing format (block letters) and vice versa. This means that once working in a cursive mode, the conversion touch event will be associated both with the respective letter (according to the specific key or intermediate area) as well as the conversion function, indicated by identifying the continuous touch that reaches or exceeds the borders of virtual symbols keyboard 100. The identified letter will appear over text window 110 according to the identified writing mode thereof. Exceptions to the rule are the letters I and C, associated with a single direct touch over virtual keys 11 and 19, respectively, according to index table 50, which are located in the middle of virtual symbols keyboard 100. In their case the mode conversion may be defined according to another rule such as for example, identification of a continuous key touch that includes a rounded movement based touch over the respective virtual key area. This will require the user to turn his/her finger or any other input tool or computer mouse marker over the respective key of 11 or 19 and thereby both input the respective letter associated therewith as well as defining the input mode as a capital letter.

FIG. 4 shows all optional touch combinations for the twelve-letter keys cluster of virtual symbols keyboard 100, in respect to indexing of index table 50 of FIG. 5. According to FIGS. 4-5 virtual keys: 1, 3, 5, 9, 11, 13, 19, 21, 25 and 23 are each associated with a single character additionally to being associated with other one or more characters in combination with other adjacent keys. This means that a single direct key-press over each on of these keys is associated by processing module 200 (using index table 50) with a single letter/punctuation mark/space such as key 1, which is associated with the letter U, similar in shape to the symbol indicated thereby.

As illustrated in FIG. 4, intermediate areas of virtual symbols keyboard 100 are areas indicated by horizontal arrows 2, 4, 10, 12, 18, 20, 26 and 28 and vertical arrows 6-8, 14-16 and 22-24. These vertical and horizontal arrows indicate the intermediate areas between each two adjacent keys that are associated with characters. According to this embodiment only vertical and horizontal adjacent keys can be associated with a character but any other adjacent directionality can be designed depending on language letter type and shape and the number of letter-keys. For example, other virtual symbol keyboard designs may allow vertical, horizontal and/or diagonal association meaning that additionally or alternatively some diagonally adjacent pairs of keys may be associated each with a respective different character/punctuation mark/function.

The symbols indicated by each virtual key of virtual symbols keyboard 100 over input and presentation unit 310 are graphically related (in shape) to all the characters they are associated with. For example, the symbol U of key 1 is graphically related to the Latin letter u/U, and to parts of the shape of Latin letters W and X as illustrated in index table 50 of FIG. 5.

Some of the keys may also be used as function keys when pressed in a single-key press. For example key 8 of virtual symbols keyboard 100 may be used as a "Caps Lock" function key when pressed directly thereover, allowing switching from Capital letters to miniscule letters. Alternatively, a touch over an intermediate area such as intermediate area 8 may be associated with a punctuation mark such as a question mark "?".

According to some embodiments, virtual symbols keyboard 100 creates all twenty-six Latin letters of the A-Z, the SPACE bar and two punctuation marks (such as a period "." and a question mark "?") using merely twelve keys requiring a single press or touch per desired input character/function enabling using a single finger/tool. In these embodiments, each click/drag or press directly over a virtual key or over an intermediate area between adjacent keys is translated into an input letter, punctuation mark or operate a function.

As mentioned above, the twelve-keys set as presented in FIGS. 1, 3 and 4 may be used as a letter keys cluster in a virtual symbols keyboard having a larger number of virtual keys where the other keys may be used as function keys, number keys and/or Letter keys cluster of another language or language type. This means that only the letter keys are reduced from a number that equals or exceeds the number of overall letters in the specific language type to a significantly smaller number of symbols and therefore keys. In respect to the embodiments given in this document referring to the Latin alphabet, which includes twenty-six letters and therefore in a regular keyboard requires a letter keys cluster of at least twenty-six keys, the number of keys required in the letter keys cluster of the virtual symbols keyboard is reduced by more than half the number of keys (to twelve keys).

According to some embodiments of the present invention, the system may additionally enable indicating an unrecognized touch event when the user touches an area of said virtual symbols keyboard that is not associated with any character, punctuation mark or function. For example, if the user mistakenly touches an area between two adjacent diagonal virtual keys a visual and/or auditory indication of an unrecognized key press may be outputted through mobile device's 300 indication device's (e.g. a designated sound indication through the device's speaker) and/or through text window 110. To use mobile device's output devices the system may be required (and enable to) interface with operating system thereof.

Additionally or alternatively, the system allows interfacing one or more linguistic tools such as online/offline dictionaries and/or translation applications for allowing automotive spell check and/or translation and the like.

Figure 6:
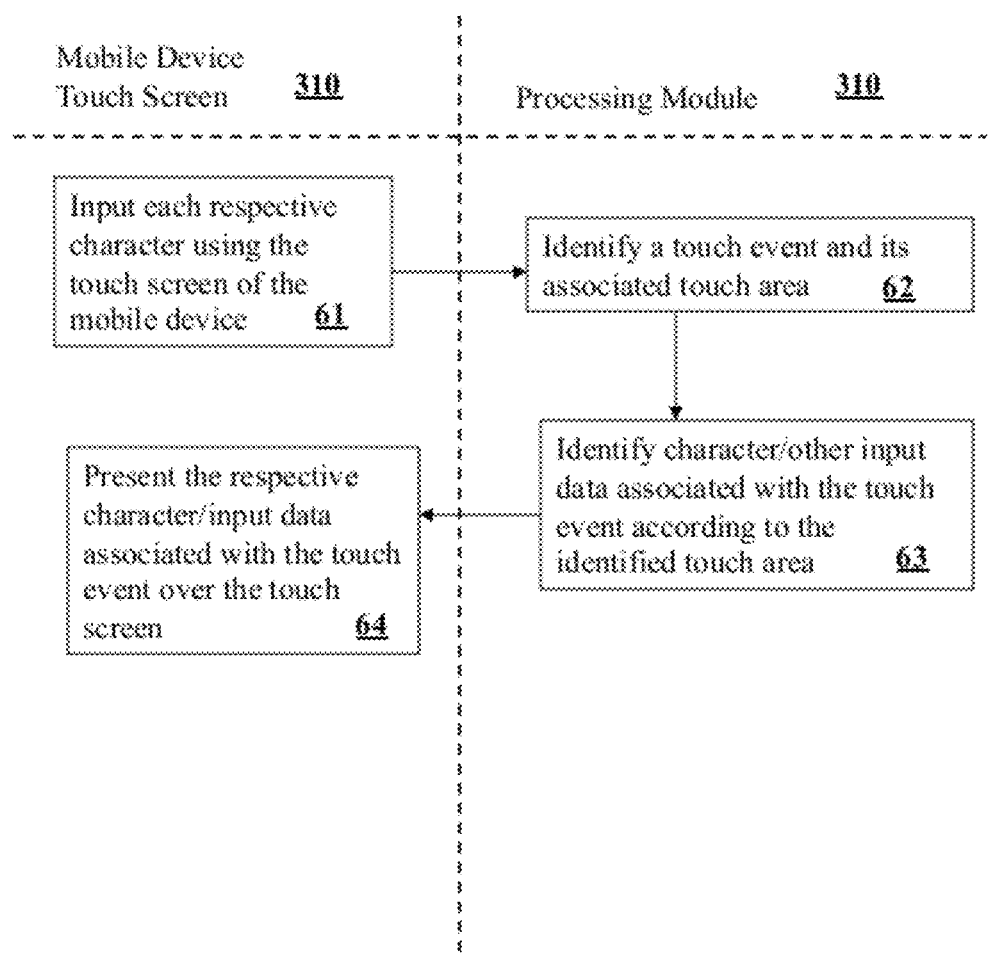
FIG. 6 is a flowchart, which schematically illustrates a method for inputting text using the virtual symbols keyboard, according to some embodiments of the present invention.

FIG. 6 is a flowchart, which schematically illustrates a method for inputting text using virtual symbols keyboard 100, according to some embodiments of the present invention. The user inputs each respective character 61 through touch screen 310, using virtual symbols keyboard 100 by touching over the associated area; either over an area of a single key or an intermediate area between two vertical/horizontal adjacent keys. Processing module 200 correspondently identifies a touch event and its associated touch area or location 62. The touch area/location allows identification of the associated input character 63 using index table 50. The identified character is then presented 64 by processing module 200 over one or more output devices (e.g. a touch screen or a screen) of mobile device 300 such as through text window 110, through one or more speakers in case of auditory presentation and the like.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A system for allowing a user to input text related data using a mobile device having an input and presentation unit, said system comprising:
   a) a virtual symbols keyboard, which includes virtual keys, each indicative of a graphical symbol, said virtual keys are presented over said input and presentation unit according to a predefined order, each respective graphical symbol graphically represents at least a part of a character, said virtual symbols keyboard is configured to allow a user to input each character by touching a designated intermediate area between two adjacent keys or by directly touching a virtual key, wherein said virtual symbols keyboard comprises twelve virtual symbol keys for inputting Latin Alphabet letters arranged as a table comprising four rows and three columns wherein:
      i. a first row of said table includes the symbols: U V ⌐ in the respective order;
      ii. a second row of said table includes the symbols: ∩ | ▢ in the respective order;
      iii. a third row of said table includes the symbols: — [ ⌋ in the respective order; and
   a fourth row of said table includes the symbols: ⊢ L - in the respective order; and
   b) a processing module, which enables identifying a touch event over said virtual symbols keyboard, occurring over each virtual key and over each said intermediate area between said respective adjacent virtual keys, and associating each touch event with a respective associated character according to the identified touch area, said processing module allows presenting each said identified associated character over said input and presentation unit,
   wherein combination of symbols of at least some pairs of adjacent virtual keys in said virtual symbols keyboard represent input characters for translating a single touch over an intermediate area between each one of said pairs into a different input character associated with the respective virtual keys pair.

2. The system according to claim 1, wherein each vertical and horizontal adjacent pair of virtual keys and each of some of said virtual keys is associated with a Latin letter, according to a predefined association index, wherein said processing module enables identifying and presenting each input Latin letter according to its corresponding touch area over said virtual symbols keyboard using said index.

3. The system of claim 1, wherein said input and presentation unit comprises at least one of: touch screen, a set including a computer mouse and a screen.

4. The system according to claim 1 further comprising a software application enabling to operate said virtual symbols keyboard and said processing module.

5. The system according to claim 4, wherein said software application is operated by at least one of: a mobile device comprising said input and presentation unit, a remote server communicating with said mobile device over at least one communication link, in which case said software application is uploaded to and by the mobile device that comprises said input and presentation unit.

6. The system according to claim 1, wherein said processing module further allows associating additional touch events with additional functions, according to predefined rules defining said touch events and their respective associated functions.

7. The system according to claim 1, wherein said virtual symbols keyboard comprises a letter keys cluster including said symbol virtual keys and additional virtual keys including at least one type of: function keys, punctuation marks keys, number keys.

8. The system according to claim 1, wherein said touching of a designated intermediate area between two adjacent virtual keys includes at least one of: clicking and dragging in at least one direction, dragging in at least one direction, and/or pressing over a designated intermediate area.

9. The system according to claim 1 further allows identifying by allowing using at least one of: finger, designated touch tool operatively associated with said input and presentation unit.

10. The system according to claim 1, wherein said processing module further enables receiving parameters indicative of characteristics of a display area of said input and presentation unit and determining and setting display characteristics of said virtual symbols keyboard thereover, according to said parameters.

11. The system according to claim 1, wherein said virtual symbols keyboard allows a user to select at least one output type and said processing module enables adapting presentation according to said output type, said output type comprises at least one of: audio output, visual output including text output.

12. The system according to claim 1 further comprising a user interface including said virtual symbols keyboard and a text window, for allowing presentation of each said identified input character over said text window according to order of inputting thereof.

13. The system of claim 1 further enabling indicating an unrecognized touch event when the user touches an area of said virtual symbols keyboard that is not associated with any character, punctuation mark or function, said indication includes at least one of: visual indication, auditory indication.

14. A computer implemented method for allowing a user to input text related data using at least one input and presentation unit, said method comprising:
a) providing a virtual symbols keyboard including virtual keys, each indicative of a graphical symbol, said virtual keys are presented over said input and presentation unit according to a predefined order, each respective graphical symbol graphically represents at least a part of a character, said virtual symbols keyboard is configured to allow a user to input each character by touching a designated intermediate area between two adjacent keys or by directly touching a virtual key using a single touch for each input character, wherein said virtual symbols keyboard comprises twelve virtual symbol keys for inputting Latin Alphabet letters arranged as a table comprising four rows and three columns wherein:
  i. a first row of said table includes the symbols: ∪ ∨ ⌉ in the respective order;
  ii. a second row of said table includes the symbols: ∩ | ▢ in the respective order;
  iii. a third row of said table includes the symbols: ─ ⌐ ⌡ in the respective order; and
a fourth row of said table includes the symbols: ⊢ ∟ ‐ in the respective order;
b) identifying each touch event over said virtual symbols keyboard, occurring over each virtual key and over each said intermediate area between said respective adjacent virtual keys, and associating each touch event with a respective associated character according to the identified touch area; and
c) displaying each said respective identified input character over said input and presentation unit,
  wherein combination of symbols of at least some pairs of adjacent virtual keys in said virtual symbols keyboard represent input characters for translating a single touch over an intermediate area between each one of said pairs into a different input character associated with the respective virtual keys pair.

15. The method according to claim 14 further comprising receiving parameters indicative of characteristics of a display area of said input and presentation unit and determining display characteristics of said virtual symbols keyboard over said display area, according to said parameters.

16. The method according to claim 15, wherein said display characteristics comprise dimensions of each said virtual key and dimensions of intermediate areas between the virtual keys, wherein the display characteristics are additionally determined according to predefined threshold dimensions related parameters of each virtual key, and each intermediate area between the virtual keys.

17. The method according to claim 14 further comprising interfacing at least one linguistic tool for allowing automotive spell checking and/or translation of input text.

18. A system for allowing a user to input text related data using at least one input and presentation unit, said system comprising:
virtual keys, each indicative of a graphical symbol, said virtual keys are presented over said input and presentation unit according to a predefined symbols presentation order, each respective graphical symbol graphically represents at least a part of a character, said virtual symbols keyboard is configured to allow a user to input each character by touching a designated intermediate area between two adjacent keys or by directly touching a key using a single touch for each input character, wherein said virtual symbols keyboard comprises twelve virtual symbol keys for inputting Latin Alphabet letters arranged as a table comprising four rows and three columns wherein:
  i. a first row of said table includes the symbols: ∪ ∨ ⌉ in the respective order;
  ii. a second row of said table includes the symbols: ∩ | ▢ in the respective order;
  iii. a third row of said table includes the symbols: ─ ⌐ ⌡ in the respective order; and
a fourth row of said table includes the symbols: ⊢ ∟ ‐ in the respective order.

* * * * *